W. T. BATE.
Combined Heaters and Filters.
No. 137,878. Patented April 15, 1873.
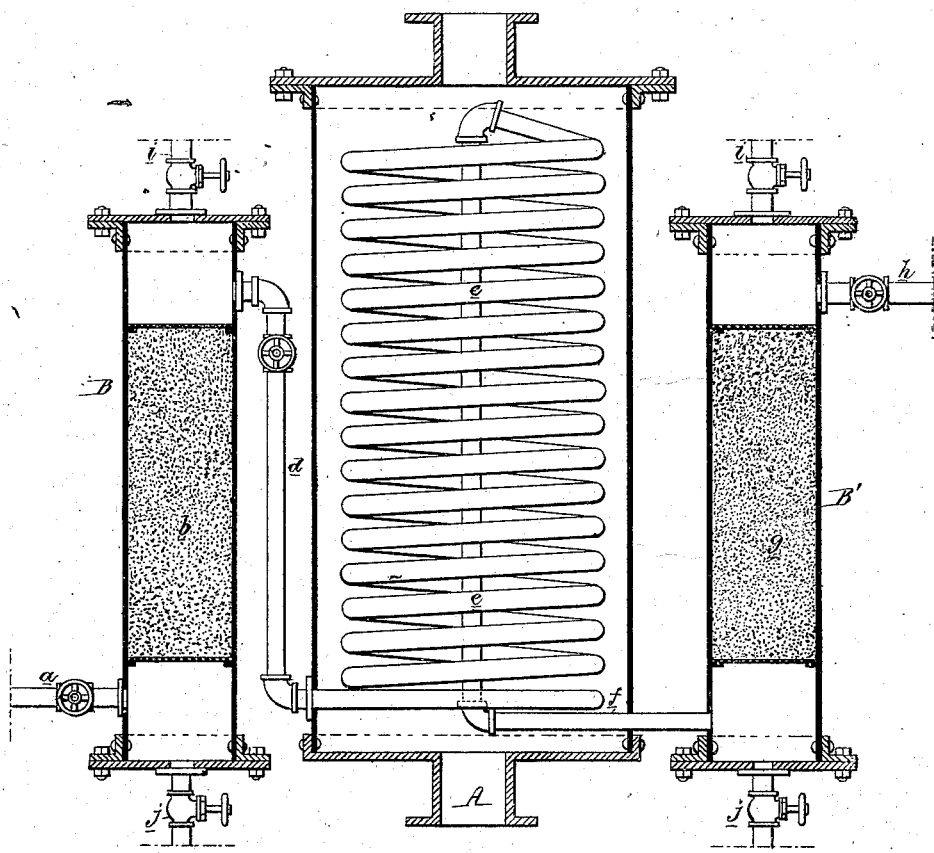
Witnesses  John K. Rupertus
Harry Smith
Wm T Bate
By his attys,
Howson and Son

UNITED STATES PATENT OFFICE.

WILLIAM T. BATE, OF NORRISTOWN, PENNSYLVANIA.

IMPROVEMENT IN COMBINED HEATERS AND FILTERS.

Specification forming part of Letters Patent No. 137,878, dated April 15, 1873; application filed July 31, 1872.

*To all whom it may concern:*

Be it known that I, WM. T. BATE, of Norristown, Montgomery county, State of Pennsylvania, have invented a Combined Feed-Water Heater and Filter, of which the following is a specification:

The object of my invention is to heat and to remove scale-producing and other impurities from feed-water for steam-boilers; and I accomplish this object by pressing the feed-water in its course toward the boiler through an apparatus in which are combined a heater, A, and a filter or filters, B, as clearly shown by the sectional view in the accompanying drawing.

The water enters the filter B through a pipe, $a$, and, after passing upward through the mass $b$ of filtering material, is conducted through a pipe, $d$, to the base of the heater A, through which exhaust steam is caused to constantly pass, and in which, while circulating through a coil, $e$, the partially-filtered water is thoroughly heated. From the coil the water passes downward through a pipe, $f$, to the bottom of the second filter, B', and upward through the filtering material $g$ in the latter to the pipe $h$, whence it is conducted to the boiler in the required heated condition and free from scale-producing and other impurities.

It will be observed that the filtration in both vessels B and B' is upward, which prevents the rapid clogging of the filtering material, but the latter, after becoming fouled, can be thoroughly cleaned in a few minutes by forcing live steam downward through the same, each filter being provided for this purpose with live steam inlet and outlet pipes $i$ and $j$, the cocks in which are opened after closing those in the water-pipes leading to and from the filters.

I prefer to employ two filters combined with a single heater, as above described, but the second filter might be dispensed with; and the construction of both heaters and filters may be modified without departing from the main features of my invention.

By passing the water through the filter before it enters the heater the latter is prevented from becoming inefficient by the deposit of mud, &c., upon the tubes.

I claim as my invention—

The combination of a feed-water heater, filters B B', and pipes or passages arranged to conduct the water through a filter both before and after it has passed through the heater, substantially as described.

In testimony whereof I have signed my name to this specification in the presence of two subscribing witnesses.

WILLIAM T. BATE.

Witnesses:
WM. A. STEEL,
HARRY W. DOUTY.